US010509101B2

(12) United States Patent
Hartman et al.

(10) Patent No.: US 10,509,101 B2
(45) Date of Patent: Dec. 17, 2019

(54) STREET LIGHTING COMMUNICATIONS, CONTROL, AND SPECIAL SERVICES

(71) Applicant: GENERAL ELECTRIC COMPANY, Schenectady, NY (US)

(72) Inventors: Michael James Hartman, Clifton Park, NY (US); Bruce Gordon Barnett, Niskayuna, NY (US); John Erik Hershey, Ballston, NY (US); Michael Joseph Mahony, Niskayuna, NY (US); Michael Joseph Dell'Anno, Niskayuna, NY (US); Stanislava Soro, Niskayuna, NY (US)

( * ) Notice: Subject to any disclaimer, the term of this patent is extended or adjusted under 35 U.S.C. 154(b) by 316 days.

(21) Appl. No.: 14/546,486

(22) Filed: Nov. 18, 2014

(65) Prior Publication Data

US 2015/0346320 A1    Dec. 3, 2015

Related U.S. Application Data

(60) Provisional application No. 61/907,090, filed on Nov. 21, 2013, provisional application No. 61/907,078, (Continued)

(51) Int. Cl.
*H05B 37/02* (2006.01)
*G01S 13/88* (2006.01)
(Continued)

(52) U.S. Cl.
CPC .............. *G01S 7/003* (2013.01); *G01S 13/88* (2013.01); *H05B 37/02* (2013.01);
(Continued)

(58) Field of Classification Search
CPC .. H05B 37/02; H05B 37/029; H05B 37/0254; H05B 37/0227; H05B 33/08;
(Continued)

(56) References Cited

U.S. PATENT DOCUMENTS 4,704,610 A    11/1987    Smith et al.
4,878,754 A    11/1989    Homma et al.
(Continued)

FOREIGN PATENT DOCUMENTS

CN    101418933 A    4/2009
CN    102287675 A    12/2011
(Continued)

OTHER PUBLICATIONS

LonMark, The Open Smart Streetlight Platform.
(Continued)

*Primary Examiner* — Jimmy T Vu
(74) *Attorney, Agent, or Firm* — Buckley, Maschoff & Talwalkar, LLC (57) ABSTRACT

A smart street lighting system and method employs a plurality of street lights having a luminaire, a luminaire associate and a support pole. A communications module is contained within the luminaire associates and a power line is contained within the support poles. The power line is coupled to the communications module, the luminaire associate and the luminaire, and a steerable millimeter wave radar operatively coupled to the communications module. The communications module operates in a radio frequency network in a frequency range of 57-64 GHz. The steerable millimeter wave radar provides a signal reflected from a target that may be received by one of the luminaire associates within the system. A powerline communications system interfaces with the radio frequency network to provide communications between the communications modules in the street lights and the PLC system.

16 Claims, 11 Drawing Sheets

Related U.S. Application Data filed on Nov. 21, 2013, provisional application No. 61/907,069, filed on Nov. 21, 2013, provisional application No. 61/907,114, filed on Nov. 21, 2013, provisional application No. 61/907,133, filed on Nov. 21, 2013, provisional application No. 61/907,150, filed on Nov. 21, 2013, provisional application No. 61/907,168, filed on Nov. 21, 2013, provisional application No. 61/907,188, filed on Nov. 21, 2013, provisional application No. 61/907,210, filed on Nov. 21, 2013.

(51) Int. Cl.
*G01S 7/00* (2006.01)
*F21S 2/00* (2016.01)
*F21S 8/08* (2006.01)
*F21V 23/04* (2006.01)
*F21W 131/103* (2006.01)

(52) U.S. Cl.
CPC ..... *H05B 37/0227* (2013.01); *H05B 37/0263* (2013.01); *H05B 37/0272* (2013.01); *F21S 2/00* (2013.01); *F21S 8/08* (2013.01); *F21V 23/0435* (2013.01); *F21W 2131/103* (2013.01); *Y02B 20/48* (2013.01)

(58) Field of Classification Search
CPC ............ H05B 37/0263; H05B 37/0272; F21Y 2101/00; Y02B 20/72; Y02B 20/48; G09G 3/3406; F21V 23/0442; F21V 23/0435; G01S 7/003; G01S 13/88; F21S 2/00; F21S 8/08; F21W 2131/103
USPC ................ 315/312, 291, 294, 318; 362/227; 340/12.5
See application file for complete search history.

(56) References Cited

U.S. PATENT DOCUMENTS

| | | |
|---|---|---|
| 5,014,052 A | 5/1991 | Obeck |
| 5,028,129 A | 7/1991 | Smith |
| 5,199,044 A | 3/1993 | Takeuchi et al. |
| 5,243,185 A | 9/1993 | Blackwood |
| 5,345,232 A | 9/1994 | Robertson |
| 5,519,692 A | 5/1996 | Hershey et al. |
| 5,519,725 A | 5/1996 | Hershey et al. |
| 5,526,357 A | 6/1996 | Jandrell |
| 5,557,261 A | 9/1996 | Barbour |
| 5,563,728 A | 10/1996 | Allen et al. |
| 5,563,906 A | 10/1996 | Hershey et al. |
| 5,568,507 A | 10/1996 | Hershey et al. |
| 5,568,508 A | 10/1996 | Hershey |
| 5,568,509 A | 10/1996 | Hershey et al. |
| 5,568,522 A | 10/1996 | Hershey et al. |
| 5,682,100 A | 10/1997 | Rossi et al. |
| 5,761,238 A | 6/1998 | Ross et al. |
| 5,822,099 A | 10/1998 | Takamatsu |
| 5,844,949 A | 12/1998 | Hershey et al. |
| 5,852,243 A | 12/1998 | Chang et al. |
| 5,903,594 A | 5/1999 | Saulnier et al. |
| 6,011,508 A | 1/2000 | Perreault et al. |
| 6,101,214 A | 8/2000 | Hershey et al. |
| 6,122,084 A | 9/2000 | Britz et al. |
| 6,288,632 B1 | 9/2001 | Hoctor et al. |
| 6,308,134 B1 | 10/2001 | Croyle et al. |
| 6,346,875 B1 | 2/2002 | Puckette et al. |
| 6,424,250 B1 | 7/2002 | Puckette, IV et al. |
| 6,430,210 B1 | 8/2002 | McGrath et al. |
| 6,433,976 B1 | 8/2002 | Phillips |
| 6,459,998 B1 | 10/2002 | Hoffman |
| 6,504,634 B1 | 1/2003 | Chan et al. |
| 6,522,243 B1 | 2/2003 | Saulnier et al. |
| 6,659,715 B2 | 12/2003 | Kuesters et al. |
| 6,693,556 B1 | 2/2004 | Jones et al. |
| 6,717,660 B1 | 4/2004 | Bernardo |
| 6,943,668 B2 | 9/2005 | Gaus, Jr. et al. |
| 7,175,082 B2 | 2/2007 | Hoshina |
| 7,248,149 B2 | 7/2007 | Bachelder et al. |
| 7,294,977 B1 | 11/2007 | Eusterbrock et al. |
| 7,418,346 B2 | 8/2008 | Breed et al. |
| 7,460,787 B2 | 12/2008 | Damink et al. |
| 7,580,705 B2 | 8/2009 | Kumar |
| 7,629,899 B2 | 12/2009 | Breed |
| 7,646,330 B2 | 1/2010 | Karr |
| 7,817,063 B2 | 10/2010 | Hawkins et al. |
| 7,834,555 B2 | 11/2010 | Cleland et al. |
| 7,855,376 B2 | 12/2010 | Cantin et al. |
| 7,876,864 B2 | 1/2011 | Conrad et al. |
| 7,899,621 B2 | 3/2011 | Breed et al. |
| 7,912,645 B2 | 3/2011 | Breed et al. |
| 7,983,685 B2 | 7/2011 | Silverstrim et al. |
| 7,983,836 B2 | 7/2011 | Breed |
| 8,092,032 B2 | 1/2012 | Pearse |
| 8,138,690 B2 | 3/2012 | Chemel et al. |
| 8,140,276 B2 | 3/2012 | Walters et al. |
| 8,195,422 B2 | 6/2012 | Wilcox et al. |
| 8,227,995 B2 | 7/2012 | Damink et al. |
| 8,232,745 B2 | 7/2012 | Chemel et al. |
| 8,244,260 B2 | 8/2012 | Silverstrim et al. |
| 8,260,537 B2 | 9/2012 | Breed |
| 8,274,373 B2 | 9/2012 | Nysen |
| 8,339,069 B2 | 12/2012 | Chemel et al. |
| 8,368,321 B2 | 2/2013 | Chemel et al. |
| 8,373,362 B2 | 2/2013 | Chemel et al. |
| 8,384,312 B2 | 2/2013 | Tsai |
| 8,436,748 B2 | 5/2013 | Mimeault et al. |
| 8,441,214 B2 | 5/2013 | Anderson |
| 8,442,403 B2 | 5/2013 | Weaver |
| 8,442,785 B2 | 5/2013 | Walters et al. |
| 8,456,325 B1 | 6/2013 | Sikora |
| 8,475,002 B2 | 7/2013 | Maxik et al. |
| 8,641,241 B2 | 2/2014 | Farmer |
| 8,840,569 B2 | 9/2014 | Flaction et al. |
| 8,842,009 B2 | 9/2014 | Jones |
| 8,947,296 B2 | 2/2015 | Raz et al. |
| 9,192,026 B2 | 11/2015 | Marquardt et al. |
| 9,192,029 B2 | 11/2015 | Marquardt et al. |
| 2002/0141882 A1 | 10/2002 | Ingistov et al. |
| 2003/0048499 A1 | 3/2003 | Alfano et al. |
| 2005/0017647 A1 | 1/2005 | Huang |
| 2005/0047864 A1 | 3/2005 | Yamada et al. |
| 2005/0104745 A1 | 5/2005 | Bachelder et al. |
| 2005/0187701 A1 | 8/2005 | Baney |
| 2007/0063875 A1 | 3/2007 | Hoffberg |
| 2007/0085701 A1 | 4/2007 | Walters et al. |
| 2007/0201540 A1 | 8/2007 | Berkman |
| 2007/0229250 A1 | 10/2007 | Recker et al. |
| 2008/0037241 A1 | 2/2008 | Von Der Brelie |
| 2008/0072766 A1 | 3/2008 | Kobylarz |
| 2008/0122642 A1 | 5/2008 | Radtke et al. |
| 2008/0150757 A1 | 6/2008 | Hutchison |
| 2008/0238720 A1 | 10/2008 | Lee |
| 2009/0002982 A1 | 1/2009 | Hu et al. |
| 2009/0033504 A1 | 2/2009 | Tsai et al. |
| 2009/0034258 A1 | 2/2009 | Tsai et al. |
| 2009/0066540 A1 | 3/2009 | Marinakis et al. |
| 2009/0120299 A1 | 5/2009 | Rahn et al. |
| 2009/0128328 A1 | 5/2009 | Fan |
| 2009/0158739 A1 | 6/2009 | Messmer |
| 2009/0164174 A1 | 6/2009 | Bears et al. |
| 2009/0167508 A1 | 7/2009 | Fadell et al. |
| 2009/0214198 A1 | 8/2009 | Takahashi et al. |
| 2009/0268453 A1 | 10/2009 | Pearse |
| 2009/0297156 A1 | 12/2009 | Nakagawa et al. |
| 2010/0013608 A1 | 1/2010 | Petrisor et al. |
| 2010/0029268 A1 | 2/2010 | Myer et al. |
| 2010/0115093 A1 | 5/2010 | Rice |
| 2010/0148696 A1 | 6/2010 | Pabst |
| 2010/0295473 A1 | 11/2010 | Chemel et al. |
| 2010/0295474 A1 | 11/2010 | Chemel et al. |
| 2010/0295475 A1 | 11/2010 | Chemel et al. |

(56) References Cited

U.S. PATENT DOCUMENTS

| | | |
|---|---|---|
| 2010/0295482 A1 | 11/2010 | Chemel et al. |
| 2010/0295943 A1 | 11/2010 | Cha et al. |
| 2010/0296285 A1 | 11/2010 | Chemel et al. |
| 2010/0301768 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2010/0308736 A1 | 12/2010 | Hung et al. |
| 2010/0309209 A1 | 12/2010 | Hodgins et al. |
| 2011/0001436 A1 | 1/2011 | Chemel et al. |
| 2011/0001438 A1 | 1/2011 | Chemel et al. |
| 2011/0001626 A1 | 1/2011 | Yip et al. |
| 2011/0043035 A1 | 2/2011 | Yamada et al. |
| 2011/0069960 A1 | 3/2011 | Knapp et al. |
| 2011/0095867 A1 | 4/2011 | Ahmad |
| 2011/0115384 A1 | 5/2011 | Chatelus |
| 2011/0140950 A1 | 6/2011 | Andersson |
| 2011/0156900 A1 | 6/2011 | Toda |
| 2011/0215736 A1 | 9/2011 | Horbst et al. |
| 2011/0227584 A1 | 9/2011 | Beck |
| 2012/0053888 A1 | 3/2012 | Staehlin et al. |
| 2012/0062123 A1 | 3/2012 | Jarrell et al. |
| 2012/0086560 A1* | 4/2012 | Ilyes ................. H05B 37/0227 340/12.5 |
| 2012/0086561 A1 | 4/2012 | Ilyes et al. |
| 2012/0126721 A1 | 5/2012 | Kuenzler et al. |
| 2012/0136485 A1 | 5/2012 | Weber et al. |
| 2012/0139774 A1 | 6/2012 | Nagy |
| 2012/0140748 A1 | 6/2012 | Carruthers |
| 2012/0154239 A1 | 6/2012 | Bar-Sade et al. |
| 2012/0163826 A1 | 6/2012 | Schenk et al. |
| 2012/0209505 A1 | 8/2012 | Breed et al. |
| 2012/0218101 A1 | 8/2012 | Ford |
| 2012/0230696 A1 | 9/2012 | Pederson et al. |
| 2012/0245880 A1 | 9/2012 | Nabrotzky |
| 2012/0256777 A1* | 10/2012 | Smith ................. G01S 7/412 342/22 |
| 2012/0262304 A1 | 10/2012 | Cripps |
| 2012/0280825 A1 | 11/2012 | Sakakihara |
| 2012/0286673 A1 | 11/2012 | Holland et al. |
| 2012/0299721 A1 | 11/2012 | Jones |
| 2012/0299755 A1 | 11/2012 | Jones |
| 2012/0308239 A1 | 12/2012 | Sheth et al. |
| 2012/0309293 A1 | 12/2012 | Kummetz et al. |
| 2012/0321321 A1 | 12/2012 | Riesebosch |
| 2012/0323474 A1 | 12/2012 | Breed et al. |
| 2013/0044488 A1 | 2/2013 | Hreish |
| 2013/0057158 A1 | 3/2013 | Josefowicz et al. |
| 2013/0063281 A1 | 3/2013 | Malaska |
| 2013/0076523 A1 | 3/2013 | Kwan et al. |
| 2013/0101003 A1 | 4/2013 | Vedantham et al. |
| 2013/0127655 A1* | 5/2013 | Kishigami ............. G01S 7/288 342/152 |
| 2013/0140995 A1 | 6/2013 | Jones |
| 2013/0144490 A1 | 6/2013 | Lord et al. |
| 2013/0169468 A1 | 7/2013 | Johnson et al. |
| 2013/0172012 A1 | 7/2013 | Zudrell-Koch |
| 2013/0181636 A1 | 7/2013 | Agrawal |
| 2013/0214697 A1 | 8/2013 | Archenhold |
| 2013/0221858 A1 | 8/2013 | Silberstein |
| 2013/0229116 A1* | 9/2013 | Van Zeijl ........... H05B 37/0227 315/153 |
| 2013/0257284 A1 | 10/2013 | VanWagoner et al. |
| 2013/0293117 A1 | 11/2013 | Verfuerth |
| 2013/0330172 A1 | 12/2013 | Scipio et al. |
| 2013/0346229 A1 | 12/2013 | Martin et al. |
| 2014/0055439 A1 | 2/2014 | Lee et al. |
| 2014/0085055 A1 | 3/2014 | Lee et al. |
| 2014/0124007 A1 | 5/2014 | Scipio et al. |
| 2014/0125250 A1 | 5/2014 | Wilbur |
| 2014/0175982 A1 | 6/2014 | Yao et al. |
| 2014/0191858 A1 | 7/2014 | Morgan et al. |
| 2015/0023668 A1 | 1/2015 | Spaulding et al. |
| 2015/0173159 A1 | 6/2015 | Lin et al. |
| 2015/0319825 A1 | 11/2015 | Destine et al. |
| 2016/0094088 A1 | 3/2016 | Bjorn et al. |
| 2016/0095182 A1 | 3/2016 | Bjorn et al. |

FOREIGN PATENT DOCUMENTS

| | | |
|---|---|---|
| CN | 102355764 A | 2/2012 |
| CN | 102854500 A | 1/2013 |
| CN | 102933979 A | 2/2013 |
| EP | 0961134 A1 | 12/1999 |
| EP | 1437270 A1 | 7/2004 |
| EP | 2131630 A2 | 12/2009 |
| EP | 2521426 A1 | 11/2012 |
| GB | 2403357 A | 12/2004 |
| JP | 05205193 A | 8/1993 |
| JP | 2005248607 A | 9/2005 |
| JP | 2009025209 A | 2/2009 |
| JP | 2009103497 A | 5/2009 |
| KR | 1020060008967 A | 1/2006 |
| KR | 1020060102552 A | 9/2006 |
| KR | 100986279 B1 | 10/2010 |
| WO | 2005029437 A2 | 3/2005 |
| WO | 2009148466 A1 | 12/2009 |
| WO | 2010079388 A1 | 7/2010 |
| WO | 2011142516 A1 | 11/2011 |
| WO | 2012090142 A2 | 7/2012 |
| WO | 2012140152 A1 | 10/2012 |
| WO | 2013160791 A2 | 10/2013 |

OTHER PUBLICATIONS

Atlas, "Optical Extinction by Rainfall", Journal of Meteorology, vol. No. 10, pp. 486-488, Dec. 1953.

Noe et al., "Global Positioning System, A Navigation Algorithm for the Low-Cost GPS Receiver", The Institute of Navigation, vol. No. 1, pp. 166-172, 1980.

Proakis, "Spread Spectrum Signals for Digital Communication," in Digital Communications, for an overview of DS theory, pp. 1-27, 1983.

Hershey et al., "Random and Pseudorandom Sequences," Data Transportation and Protection, pp. 259-310, 1986.

"Millimeter Wave Propagation: Spectrum Management Implications" published by the FCC as Bulletin No. 70, Jul. 1997.

Pang et al., "LED Traffic Light as a Communications Device", Proceedings of the International Conference on Intelligent Transportation Systems, pp. 788-793, 1999.

Mimbela et al., "A Summary of Vehicle Detection and Surveillance Technologies Used in Intelligent Transportation Systems", Southwest Technology Development Institute, pp. 1-211, Nov. 30, 2000.

Bullimore, "Controlling Traffic With Radio", IEEE Review, vol. No. 47, Issue No. 1, pp. 40-44, Jan. 2001.

Chao-Qun et al., "Application of Low-voltage Power Line Communication in a City Street Lamp Long-distance Intelligent Monitoring System", Research and Developments, 2006.

Cho et al., "Street Lighting Control Based on LonWorks Power Line Communication", Power Line Communications and Its Applications, pp. 396-398, Apr. 2008.

Awan et al., "Characterization of Fog and Snow Attenuations for Free-Space Optical Propagation", Journal of Communications, vol. No. 4, Issue No. 8, pp. 533-545, Sep. 2009.

Rich, "Light Monitoring System Keeps Glendale, Ariz., Out of the Dark", Government Technology, Oct. 24, 2011.

"Monitoring and Evaluation Protocol for the Field Performance of LED Street Lighting Technologies", Light Savers Accelerating Advanced Outdoor Lighting, Prepared by Toronto Atmospheric Fund in Partnership with Ontario Municipal Street Lighting Focus Group and Ontario Power Authority, pp. 1-32, 2011.

Qian et. al., "Based on PLC and GPRS, ZigBee street lamp wireless control system", Electronic Design Engineering, vol. No. 20, Issue No. 3, Feb. 2012.

Stevens et al., "White Paper—The Benefits of 60 GHz Unlicensed Wireless Communications" as captured by Wayback machine, SUB10 systems.com, pp. 1-10, May 7, 2012.

(56) References Cited

OTHER PUBLICATIONS

"Wireless Control and Communication System for LED Luminaires and Other Devices", San Francisco Public Utilities Commission Power Enterprise, pp. 1-15, Jun. 7, 2012.
Zotos et al., "Case study of a dimmable outdoor lighting system with intelligent management and remote control", Telecommunications and Multimedia (TEMU), 2012 International Conference on, pp. 43-48, Jul. 30-Aug. 1, 2012.
After Newtown: A new use for a weapons-detecting radar?, University of Michigan, Apr. 1, 2013.
Lee et al., "Distributed dimming control for LED lighting", Optics Express, vol. No. 21, Issue No. S6, pp. 1-16, Nov. 2013.
Copy of International Search Report and Written Opinion issued in connection with related PCT Application No. PCT/US2014/066954 dated Feb. 26, 2015.
Copy of International Search Report and Written Opinion issued in connection with related PCT Application No. PCT/US2014/066922 dated Feb. 26, 2015.
Copy of International Search Report and Written Opinion issued in connection with related PCT Application No. PCT/US2014/066957 dated Mar. 5, 2015.
Copy of International Search Report and Written Opinion issued in connection with related PCT Application No. PCT/US2014/066917 dated Mar. 5, 2015.
Copy of International Search Report and Written Opinion issued in connection with related PCT Application No. PCT/US2014/066337 dated Mar. 6, 2015.
Copy of International Search Report and Written Opinion issued in connection with corresponding PCT Application No. PCT/US2014/066948 dated Mar. 9, 2015.
Copy of International Search Report and Written Opinion issued in connection with related PCT Application No. PCT/US2014/066942 dated Mar. 20, 2015.
Copy of International Search Report and Written Opinion issued in connection with corresponding PCT Application No. PCT/US2014/066927 dated Feb. 27, 2015.
A copy of US Non-Final Office Action issued in connection with related U.S. Appl. No. 14/484,300 dated Dec. 4, 2015.
A copy of US Non-Final Office Action issued in connection with related U.S. Appl. No. 14/546,256 dated Dec. 30, 2015.
A copy of US Non-Final Office Action issued in connection with related U.S. Appl. No. 14/546,982 dated Feb. 1, 2016.
A copy of US Non-Final Office Action issued in connection with related U.S. Appl. No. 14/546,954 dated Apr. 20, 2016.
A copy of US Non-Final Office Action issued in connection with related U.S. Appl. No. 14/543,892 dated May 9, 2016.
A copy of US Non-Final Office Action issued in connection with related U.S. Appl. No. 14/546,916 dated May 11, 2016.
A copy of Final Office Action issued in connection with related U.S. Appl. No. 14/546,256 dated Jun. 2, 2016.
A copy of Notice of Allowance Office Action issued in connection with related U.S. Appl. No. 14/543,892 dated Aug. 26, 2016.
A copy of Notice of Allowance Office Action issued in connection with related U.S. Appl. No. 14/546,954 dated Sep. 16, 2016.
Chapman et al. "Pulse Compression", Radar Systems Analysis and Design Using MATLAB, pp. 1-37, 2000.
Li-Qing et al. "Positioning System for Freight Vehicle Based on RFID Technology", Computing Technology and Automation, vol. No. 30, Issue No. 1, pp. 39-44, Mar. 2011.
Fernandes et al. "Power Line Communication in Energy Markets", Cypress, Published in Industrial Control DesignLine, pp. 1-15, Aug. 2011.
Jing et al. "Research on GPS /RFID Integration Algorithm Based on the Optimal Selection of RFID Observations", Journal of National University of Defense Technology, vol. No. 34, Issue No. 2, pp. 70-75, Apr. 2012.
Unofficial English Translation of Chinese Office Action issued in connection with related CN Application No. 201480073800.4 dated Apr. 21, 2017.
A copy of US Non-Final Office Action issued in connection with related U.S. Appl. No. 14/546,408 dated May 11, 2017.
Unofficial English Translation of Chinese Office Action issued in connection with related CN Application No. 201480073799.5 dated May 24, 2017.
Unofficial English Translation of Chinese Office Action issued in connection with related CN Application No. 201480073816.5 dated Jun. 2, 2017.
Unofficial English Translation of Chinese Office Action issued in connection with related CN Application No. 201480073801.9 dated Jun. 2, 2017.
A copy of European Search Report and Opinion issued in connection with related EP Application No. 14863951.1 dated Jun. 7, 2017.
A copy of European Search Report and Opinion issued in connection with related EP Application No. 14863466.0 dated Jun. 14, 2017.

* cited by examiner

FIG. 1A roadway

STREET LIGHTING COMMUNICATIONS, CONTROL, AND SPECIAL SERVICES

CROSS REFERENCE TO RELATED APPLICATIONS

This application is a non-provisional of and claims the benefit of U.S. Provisional Patent Applications Ser. Nos. 61/907,069, 61/907,078, 61/907,090, 61/907,114, 61/907,133, 61/907,150, 61/907,168, 61/907,188 and 61/907,210 filed on Nov. 21, 2013, the entire contents of which are incorporated herein by reference.

BACKGROUND

As a society moves forward, it is faced with the perennial problem of an aging infrastructure. Any large infrastructure immediately begins to age after completion. Much of the technology used in its construction ages by the time the infrastructure project is finished. As technology moves forward, as social mores evolve and the populace's expectations shift, technology improvements and changes to the infrastructure will be irresistibly mandated. One prominent example of such concerns street lighting.

Street lighting continues to be one of a city's most important and pressing concerns for various reasons. A first reason is to ensure that adequate lighting is provided for the safety of pedestrian, bicyclists, vehicle operators and passengers. A second reason is cost. Conventional lighting is costly to operate and to maintain. It is for this reason that many city infrastructure authorities have decided to either replace or newly install street lighting that is LED-based. Improvement of the monitoring and control of the street lighting is also entailed in upgrading a street lighting architecture.

In general it is not sufficient to just improve a single infrastructure but it is desirable to integrate various and disparate infrastructures in order to create a synergistic result that can be derived from using their various functions in combination with one another. An upgraded infrastructure may also provide "hooks and handles" for interfacing with future additions to the infrastructure, such as accommodating additional functions and public service missions.

There is therefore a need to upgrade street lighting infrastructure and accommodate other societal services with improvements to street lighting architecture.

SUMMARY

A smart street lighting system and method employs a plurality of street lights, each having a luminaire, a luminaire associate, and a support pole, a communications module within each of the luminaire associates, a power line within each of the support poles, the power line is coupled to the communications module, the luminaire associate and the luminaire, and may have a steerable millimeter wave radar operatively coupled to the communications module. The communications module operates in a radio frequency network in a frequency range of 57-64 GHz.

An embodiment allows for assessing the existence of open parking spaces using a millimeter wave radar.

Another embodiment allows for the assessing traffic density and using Doppler information derived from the millimeter wave radar to estimate traffic flow rates.

Another embodiment employs a Doppler-polarimetry mode for the millimeter wave radar to alert of a pedestrian carrying a metallic object.

BRIEF DESCRIPTION OF THE ILLUSTRATIONS

DETAILED DESCRIPTION

Figure 1A:
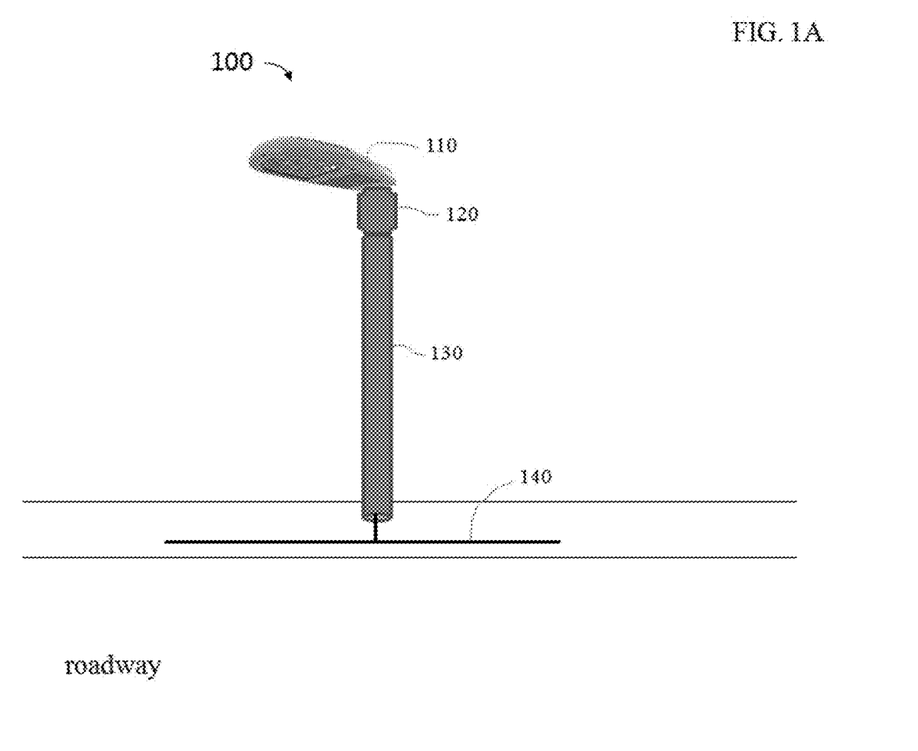
FIG. 1A is an illustration of segmentation within a lighting fixture according to one embodiment.

An embodiment of the invention is illustrated by the lighting fixtures of the lighting system shown in FIG. 1A. The lighting fixture 100 comprises a lamp or luminaire 110, supported by a luminaire associate 120. The luminaire associate 120 may include electronic components, electrical circuitry, and mechanical couplings associated with the mounting and control of the luminaire 110. The luminaire associate 120 may be mounted atop a pole 130 that also provides a conduit for the powerline 140 serving the luminaire associate 120 and the luminaire 110.

Figure 1B:
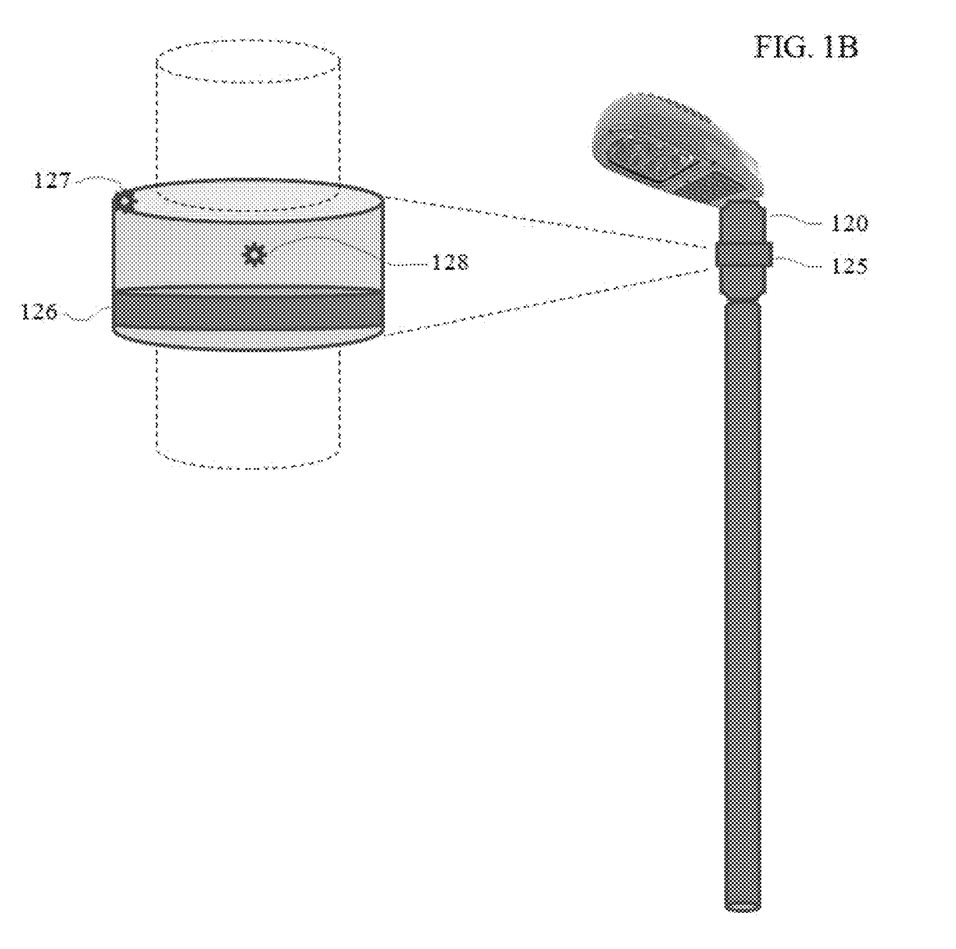
FIG. 1B is a partial illustration for a communications, control and special service module in a luminaire associate according to one embodiment.

FIG. 1B is an illustration for an embodiment of a luminaire associate 120 with a communications module 125. The communications module 125 provides communications facilities and may provide control and special service functions, thereby forming a communications, control and special service (C2S2) module 125. In an embodiment, the C2S2 module 125 may provide sophisticated services. These services may be in addition to or in place of communications services.

An embodiment envisions that the C2S2 module 125 may provide a one-way or two-way communication link to an RF network that supports several functions including control of the street lighting system. In an embodiment, the C2S2 module 125 may also monitor the individual luminaire that it is physically mounted upon. Embodiments are envisioned wherein an individual luminaire may use one or more sensors 127 to gather information on that luminaire's condition. Data may be collected detailing information such as the physical integrity of the luminaire, the luminaire's operational condition, such as its light output and power consumption. The C2S2 module 125 may also host various sensors 128 and antennas 126 for performing other infrastructure functions such as, for example and not by way of limitation, assessing environmental conditions, characterizing traffic flow, inventorying a status of parking space availability and determining if a person walking may be concealing a metal object.

Figure 2A:
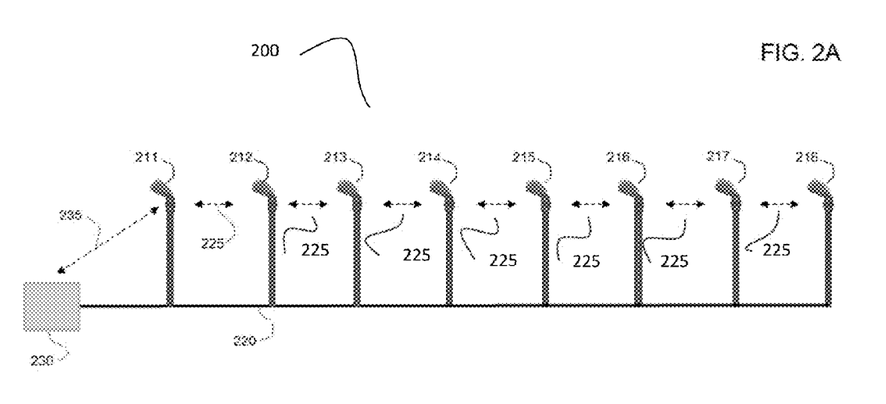
FIG. 2A is an illustration for an example of an radio frequency (RF) communications connected street lighting system with a common powerline according to one embodiment.

FIG. 2A is an illustration for an embodiment of a street lighting system 200 having a common powerline 220. In FIG. 2A each of the eight lighting fixtures 211-218 are connected to powerline 220 which in turn is connected to a power control function subsystem 230. The power control function subsystem 230 is a subsystem of the lighting control system that controls electrical power supplied to the lighting fixtures via power line 220. The power control function subsystem 230 may also function as a gateway to private networks that may be used by the lighting control system or public networks such as the Internet.

Still referring to FIG. 2A, an RF network is shown that may support several functions within the street lighting system 200. Control of the street lighting system 200 may be realized by an interconnection of geographically proximate luminaire associates by RF links 225. An example of links 225 is indicated between luminaire associates of lighting fixtures 211 and 212. It should be noted that the arrows between adjacent luminaire associates 211-218 refer to various RF links 225.

Figure 2B:
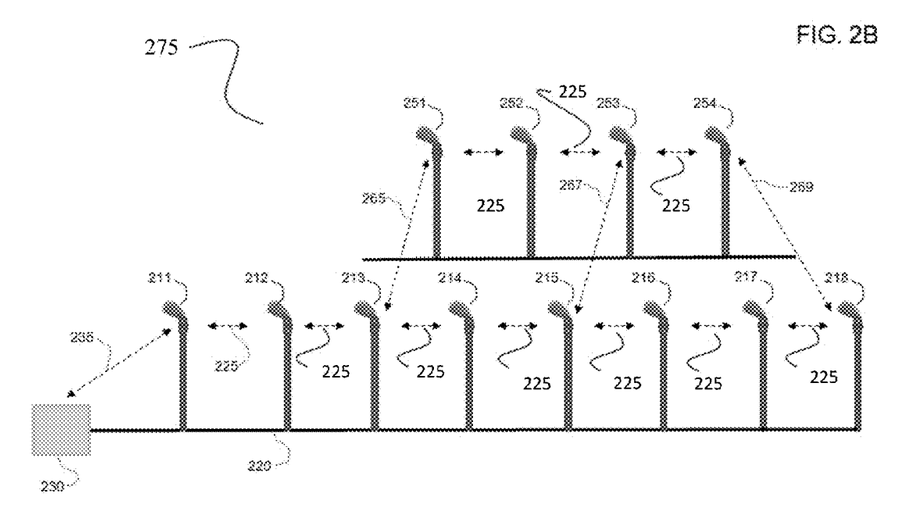
FIG. 2B is an illustration for an example of an RF mesh communications connected street lighting system according to one embodiment.

The RF network may support several functions within a mesh network of luminaires including control of the street lighting system. FIG. 2B illustrates another section of a street lighting system comprising lighting fixtures 251-254 in addition to lighting fixtures 211-218 that together form a mesh network 275. The RF network further comprises an RF link 265 between lighting fixtures 213 and 251, an RF link 267 between lighting fixtures 215 and 253, and an RF link 269 between lighting fixtures 218 and 254.

In some embodiments the power control function subsystem 230 may address and control and monitor individual luminaires or groups of luminaires via the RF link 235. The subsystem may receive data concerning one or more luminaires and sensor data provided by the one or more luminaire C2S2 modules. In some embodiments this data may be sent to the power control function subsystem 230 via the power line 220, in other embodiments the data may be transmitted to the power control function subsystem 230 via RF as, for example, by a link 235 from a nearby luminaire associate.

The RF network may support several functions including controlling the street lighting system. An embodiment may make use of the seven GHz of contiguous spectrum (57-64 GHz) that the FCC set aside in 2001 for unlicensed operation. Electromagnetic propagation in this seven GHz slice of spectrum has notable characteristics that may be used for advantage by the RF network in its support of several functions including controlling the street lighting system. The wavelengths are very small, on the order of five millimeters. These short wavelengths will allow high gain antennas to be realized in a significantly small space. These short wavelengths will also allow a steerable antenna, or a plurality of antennas, to be mounted in close proximity to enable beam steering and multi-beam forming.

Figure 3A:
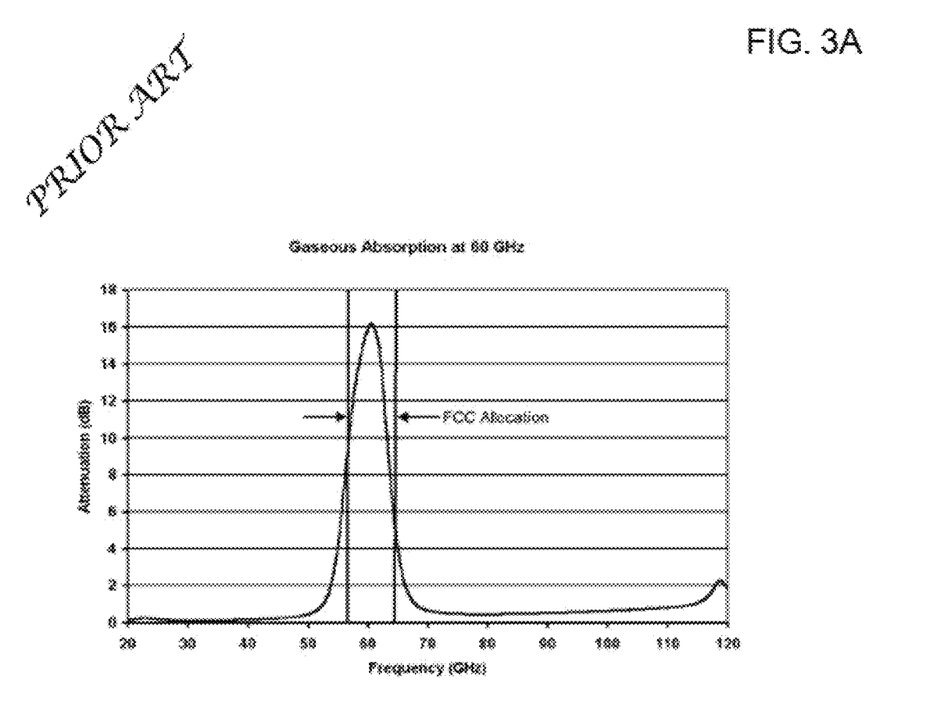
FIG. 3A is a prior art illustration of oxygen attenuation per kilometer at sea level versus frequency according to one embodiment.
Figure 3B:
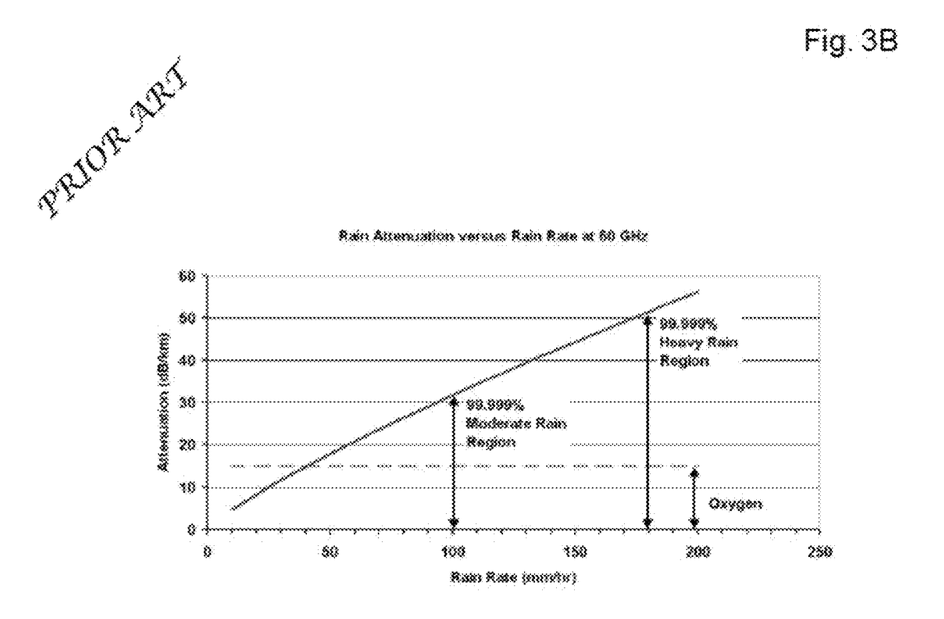
FIG. 3B is a prior art illustration of rain attenuation per kilometer versus rain rate at 60 GHz according to one embodiment.

There is high attenuation of electromagnetic propagation at sea level due to oxygen absorption. As illustrated in FIG. 3A, the rate of oxygen absorption ranges from a minimum of 5 dBs per kilometer to a maximum of 16 dBs per kilometer. The high attenuation due to oxygen absorption will reduce the effects or occurrences of interfering signals. This absorption phenomenon also imparts a security advantage militating against malicious jamming or insinuation of unauthorized signals. Humidity does not appear to be a pronounced absorber; however, rainfall certainly can be a pronounced absorber. FIG. 3B illustrates rain attenuation per kilometer versus rain rate for a 60 GHz transmission. The sensitivity from absorption due to the rainfall rate per kilometer of a path length can be used to sense the presence of rain and estimate the rainfall rate. This may be useful information to gather for controlling the illumination times and intensities of luminaires within the rainfall affected areas.

Notwithstanding oxygen and rainfall absorption, it is expected that received power from a transmitter may drop off as approximately the inverse of distance squared rather than exhibit a higher rate of drop off, such as the inverse fourth power that is noted in some cellular communication situations. The rapid rate of drop off of received power from a transmitter, noted in some cellular communication situations, is due to direct and reflected rays negatively interfering with each other. The breakpoint distance is defined as the distance beyond which the inverse fourth power law may apply and at the extremely high frequencies of millimeter wave communications, the breakpoint distance of a two-ray (direct and reflected) model may be quite large. The breakpoint distance is here denoted as $d_{BP}$ and is found by computing $d_{BP}=4h_T h_R/\lambda$ where $\lambda$ is the wavelength and $h_T$ and $h_R$ are the respective transmitter and receiver antenna heights.

Figure 4:
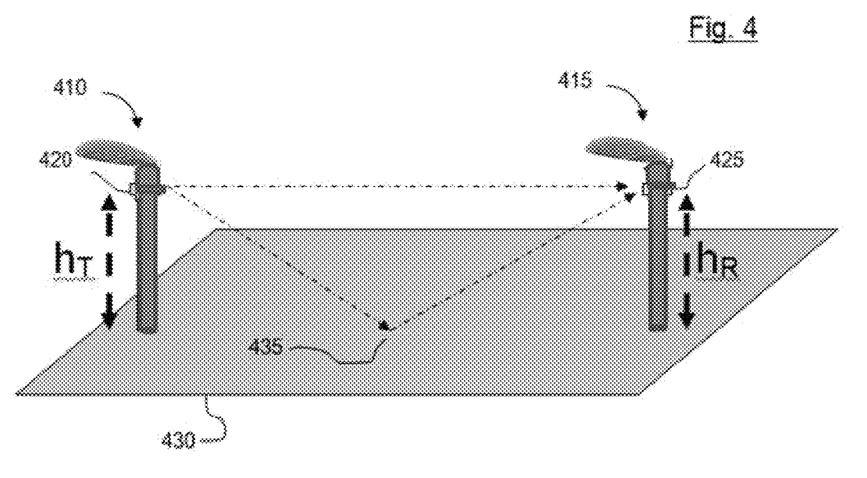
FIG. 4 is an illustration of the geometry for a direct and a reflected wave between two lighting fixtures according to one embodiment.

FIG. 4 illustrates the geometry for two lighting fixtures 410, 415 having respective C2S2 modules 420, 425. As seen in FIG. 4 a direct RF wave between C2S2 420 and C2S2 425 and a reflected RF wave off of the street 430 at location 435. For an example, consider a 60 GHz transmission between two C2S2s, 420 and 425, having antennas 20 meters above the street. The frequency of 60 GHz is approximately in the middle of the unlicensed band of the embodiment of the RF network, 57-64 GHz. For this frequency and for the antenna heights of the embodiment, $d_{BP}=4\cdot 20\cdot 20/0.005$ meters=320 kilometers. This calculated breakpoint distance far exceeds the expected inter-lighting fixture spacing distance in a street lighting system. The fact that the breakpoint distance, beyond which the attenuation rate moves from that of free space, which is the inverse of distance squared, to that of inverse of distance to the fourth power, is very large provides confidence that line of sight millimeter wave communications should function well in the dielectric canyons of a city with tall buildings facing its streets.

In one embodiment, the RF network may function as a data transport network for transporting data to and from one or more access ports serving powerline communications (PLC) systems. The PLC systems may be used to carry modulated data via a powerline and constructed on a multi-carrier system such as Orthogonal Frequency-Division Multiplexing (OFDM), Geometric Harmonic Modulation (GHM), or other suitable genre of PLC modulation. PLC systems may communicate with the RF network through the use of powerline-RF bridges and RF links to a C2S2 module. Powerline-RF Bridges allow signals on one powerline to be communicated to another powerline through radio frequency communications. A powerline-RF bridge may operate in various modes according to differing embodiments. Below are two modes of operation that Powerline-RF Bridges may employ.

In the first mode of powerline-RF bridge operation, a first PLC signal is received and demodulated by a first powerline-RF bridge and the data carried by the first PLC signal is recovered. The data carried by the first PLC signal is then transmitted to a first C2S2 module by an RF link between the first powerline-RF bridge and the first C2S2 module. The data travels on the RF network to a second C2S2 module that has an RF link to a second powerline-RF bridge. When the data arrives at the second C2S2 module, the data carried by the first PLC signal is transmitted on the RF link between the second C2S2 module and the second powerline-RF bridge. The second powerline-RF bridge modulates the data carried by the first PLC signal onto a second PLC signal which is placed onto a second PLC system.

In the second mode of powerline-RF bridge operation, a PLC signal is received by a first powerline-RF bridge and the PLC signal transmitted to a first C2S2 module by an RF link between the first powerline-RF bridge and the first C2S2 module. The PLC signal travels on the RF network to a second C2S2 module that has an RF link to a second powerline-RF bridge. When the PLC signal arrives at the second C2S2 module, the PLC signal is transmitted on the RF link between the second C2S2 module and the second powerline-RF bridge. The second powerline-RF bridge places the PLC signal onto a PLC system of the same genre of PLC modulation as the PLC signal that was received by the first powerline-RF bridge.

Figure 5:
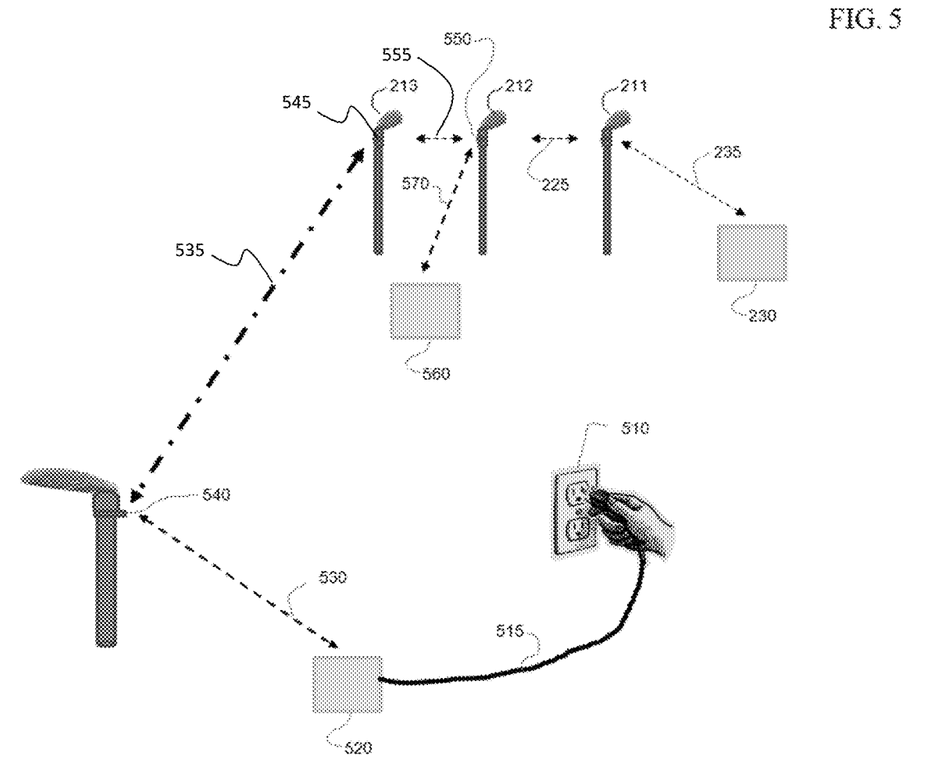
FIG. 5 is an illustration of an access port to a PLC network according to one embodiment.

FIG. 5 illustrates an access port 510 to a PLC network. The access port 510 as shown in FIG. 5 is an electrical wall socket. This illustrates the versatility of the embodiments discussed herein. The access port 510 may also be a powerline for another set of street lights carrying a PLC signal or a power system within a dwelling could carry the PLC signal to access port 510. The PLC signal from the access port 510 is connected by connector 515 to a powerline-RF bridge 520. The powerline-RF bridge 520 communicates with a C2S2 module 540 by an RF link 530. The RF network transports the PLC signal or PLC data depending upon the mode of the powerline-RF bridge 520 to another C2S2 module 545 via RF link 535 and then to C2S2 module 550 via RF link 555 where the PLC signal or the PLC data is transmitted by an RF link 570 to a powerline-RF bridge 560.

Figure 6:
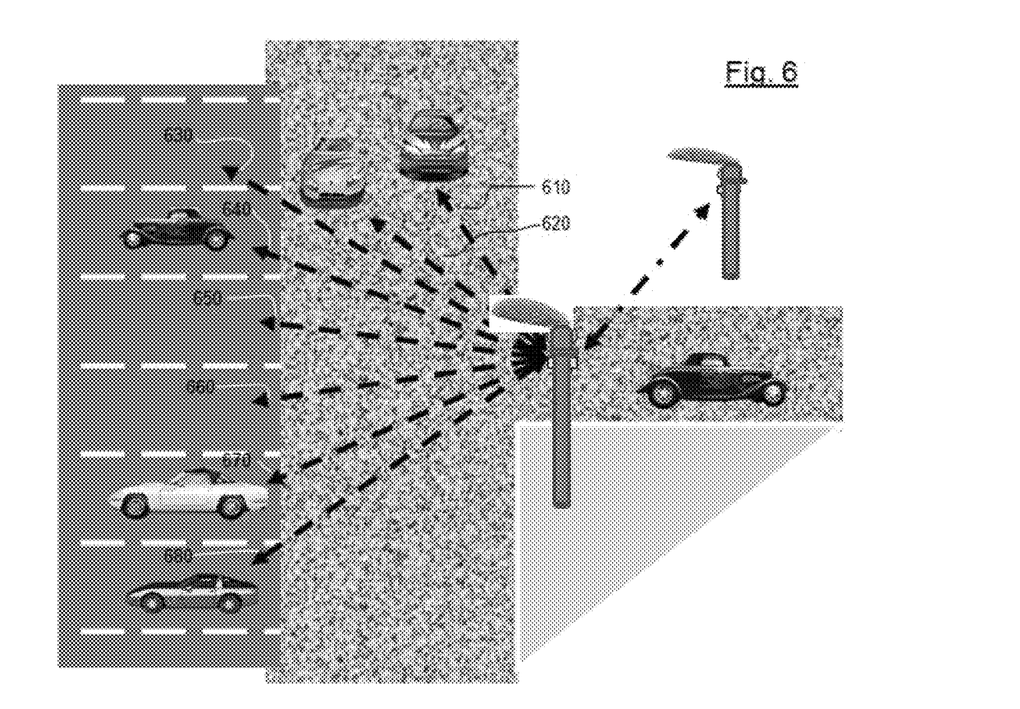
FIG. 6 is an illustration of special services relating to vehicle monitoring according to one embodiment.

In one embodiment of the special services provided, the C2S2 module may be equipped with a millimeter wave radar having a steerable beam employing Doppler measurement capability and signal processing. The millimeter wave radar beam may be steered in the direction of traffic and a reflected signal returned to the radar resulting from an interaction of the illuminating radar beam and the illuminated traffic. The returned signal may be processed and used to monitor traffic flow characterized by traffic density and the speed of one or more vehicles. This service may be performed by the C2S2 module of a luminaire as depicted in FIG. 6. A single millimeter wave antenna may be provided to the C2S2 module of a luminaire so that the antenna transmit aperture can illuminate the roadway and receive a return signal from the electromagnetic energy reflected from vehicles illuminated by the millimeter wave. This is depicted by the rays 610 and 620. The returned signal may be processed using signal processing techniques that are known in the art to estimate traffic conditions such as the number of vehicles in a stretch of the monitored roadway and also the average speeds of those vehicles.

In another embodiment of the special services provided, the C2S2 module functions as a millimeter wave radar to audit the status of parking spaces for vehicle occupancy. For this embodiment the C2S2 module is fitted with a plurality of antennas or a steerable antenna, both of which are generally referred to herein as "a steerable antenna", and the millimeter wave radar steers the millimeter wave beam towards particular parking spots 630-680. A vacant parking space will return a signal significantly different from the signal returned from an occupied parking space. The return signal can be processed using signal processing techniques well known in the art to estimate whether or not there is a vehicle in the particular parking spot.

In yet another embodiment, the C2S2 module may also serve a security function. Professor Kamal Sarabandi suggested that a millimeter wave radar with Doppler and polarization capability combined with signal processing may be used in the security arts. His research was reported by in an article entitled "After Newtown: A new use for a weapons-detecting radar?" the article was published in Science Daily Apr. 1, 2013, and can be found on the internet at the location below. http://www.sciencedaily.com/releeases/2013/04/130401112040.htm?utm_source=feedburner&utm_medium=feed&utm_campaign=Feed%3A+sciencedaily+%28Latest+Science+News+--+ScienceDaily%29.

By combining millimeter wave radar with Doppler processing and a polarimetric capability, it is envisioned that the C2S2 may be used for remotely assessing the probability that a walking person may be carrying a concealed metal object. The method uses the Doppler mode of the millimeter wave radar to identify a person walking, shaping the millimeter wave radar's beam so that the millimeter wave radar return from the person walking may be segmented into returns from portions of the walking person's body and then performing polarimetric processing of that segment of the walking person's return that most likely corresponds to the walking person's torso.

Figure 7:
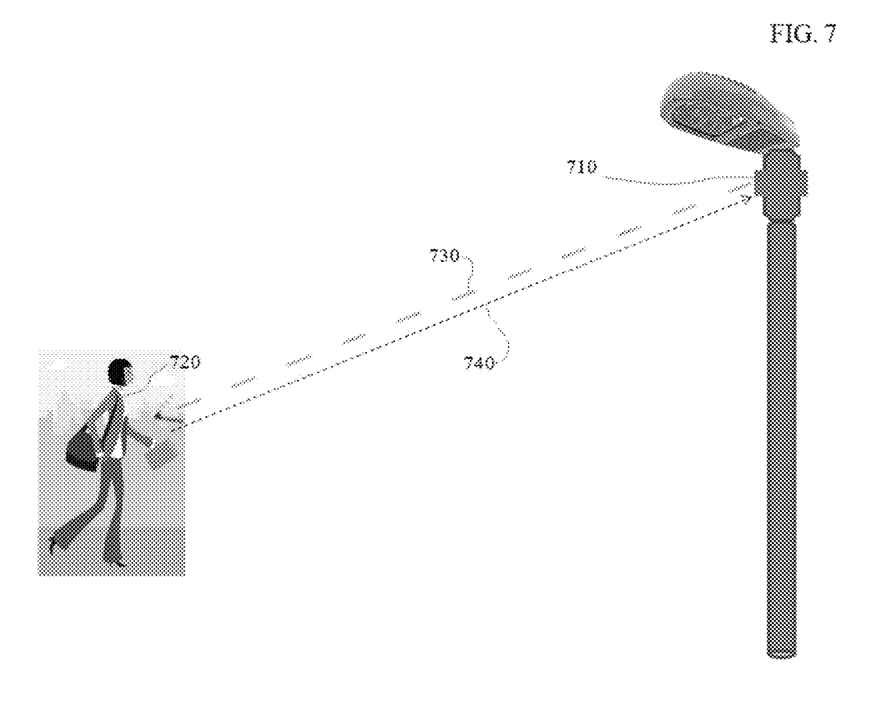
FIG. 7 is an illustration of a steerable millimeter wave radar with Doppler polarimetric capability according to one embodiment.
Figure 8:
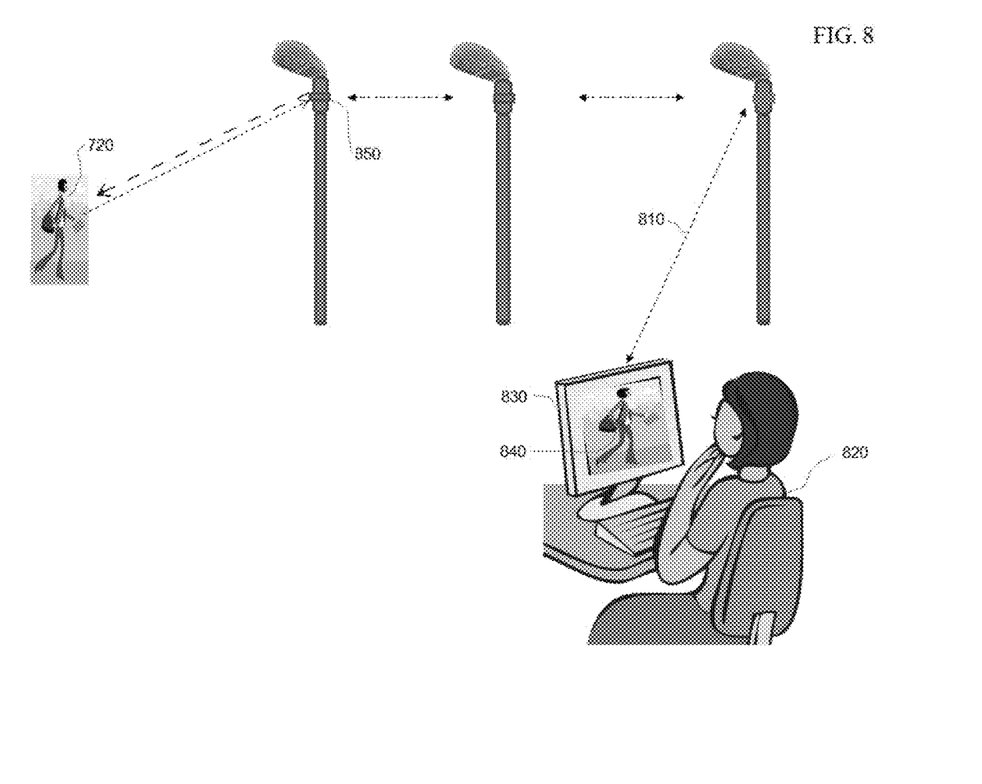
FIG. 8 is an illustration of an operator remotely operating the steerable millimeter wave radar with Doppler polarimetric capability according to one embodiment.

FIG. 7 illustrates a C2S2 module 710 that is equipped with a steerable millimeter wave radar having Doppler polarimetric capability. A walking target 720 is identified by illuminating the walking target 720 with the steered and shaped millimeter wave radar beam 730. Polarimetric processing is then performed on the millimeter wave energy 740 that is returned to the millimeter wave radar. FIG. 8 illustrates an operator 820 with a control and display console 830 connected to the RF network through an RF link 810. The operator 820 is controlling the steerable millimeter wave radar with Doppler polarimetric capability included within C2S2 850 to investigate a walking target 720. The polarimetric processing indicates the presence of a concealed metallic object 840.

An exemplary technical effect of the methods and systems described herein includes: (a) generating a melt pool based on the build parameters of the component; (b) detecting an optical signal generated by the melt pool to measure the size or the temperature of the melt pool; and (c) modifying the build parameters in real-time based on the size or the temperature of the melt pool to achieve a desired physical property of the component.

Some embodiments involve the use of one or more electronic or computing devices. Such devices typically include a processor or controller, such as, without limitation, a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein.

The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments for enhancing the build parameters for making additive manufactured components are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with electronic components as described herein. Rather, one or more embodiments may be implemented and utilized in connection with other industries.

Although specific features of various embodiments of the invention may be shown in some drawings and not in others, this is for convenience only. In accordance with the principles of the invention, any feature of a drawing may be referenced or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A street lighting system, comprising:
   a radio frequency (RF) street lighting control system comprising a plurality of communication links in a 57-64 GHz frequency range;
   a plurality of street lights having a luminaire, a luminaire associate, a support pole, and a power line operatively coupled to the luminaire and the luminaire associate;
   a communication module within the luminaire associate that is communicatively coupled to the RF street lighting control system; and
   a steerable millimeter wave radar communicatively coupled to the communications module, wherein the millimeter wave radar has a Doppler processor combined with polarimetric processing capability, further wherein the polarimetric processing is performed on a millimeter wave energy returned to the millimeter wave radar.

2. The system of claim 1, further comprising:
   a powerline communications (PLC) system coupled to the power line for at least some of the street lights;
   at least one PLC access port communicatively coupled to the PLC system; and
   at least one PLC-RF bridge communicatively coupled to the PLC access port and at least one of the communication links.

3. The system of claim 2 wherein the communication links transport from a network that transports data between multiple of the PLC access ports.

4. The system of claim 1 further comprising a power control function that controls power to the street lights using the RF street lighting control system to transmit instructions to the communications module in the luminaire associate.

5. The system of claim 1 wherein the millimeter wave radar beam may be steered towards a target area and a reflected signal returned to the millimeter wave radar.

6. The system of claim 5 wherein the target area is a traffic area and the reflected signal is processed by the Doppler processor to determine traffic conditions.

7. The system of claim 6 further comprising a signal processor that allows the millimeter wave radar with the Doppler processor and polarimetric capability to determine if a person is concealing a metal object.

8. The system of claim 1 wherein a monitoring and control of the street lights is provided by at least one sensor within the luminaire associate that is communicatively coupled to the communication links enabling data transfer between the at least one sensor and the system.

9. The system of claim 8 wherein the at least one sensor is configured to gather a predetermined type of information, wherein the predetermined type of information is selected from at least one of the following: physical integrity of the street light component; operational condition of the street light component; light output; power consumption; assessing environmental conditions; characterizing traffic flow; or inventorying parking space availability.

10. A method for communicating information using smart street lights, comprising:
    aiming a steerable millimeter wave radar comprising a Doppler processor combined with polarimetric processing capability contained within a street lighting system towards a target area;
    receiving a reflection of millimeter waves from the target area by a millimeter wave antenna contained within the street lighting system;
    processing the reflection of millimeter waves with the Doppler processor with polarimetric processing capability;
    performing polarimetric processing on a millimeter wave energy returned to the millimeter wave radar; and
    communicating the reflection of millimeter waves to a predetermined destination within the street lighting system using at least one of a plurality of radio frequency (RF) links in a 57-64 GHz frequency range.

11. The method of claim 10, wherein aiming further comprises aiming the steerable millimeter wave radar towards a parking area as the target area; and
    processing the reflection of millimeter waves to search for open parking spaces.

12. The method of claim 10, wherein the target area is a traffic area and processing further comprises processing the reflection of millimeter waves by the Doppler processor to determine traffic conditions.

13. The method of claim 10, further comprises aiming the steerable millimeter wave radar towards a walking pedestrian as the target area and detecting with the Doppler processor with polarimetric processing if the walking pedestrian is carrying a metallic object.

14. The method of claim 10, wherein communicating further comprises communicating between a first powerline communications (PLC) system and a second PLC system using the RF links.

15. The method of claim 10, further comprising monitoring the street light system using the RF links.

16. The method of claim 10, further comprising transmitting instructions using the RF links to control power distributed to the street light system.

* * * * *